(12) United States Patent
Leidefeldt et al.

(10) Patent No.: US 10,865,740 B2
(45) Date of Patent: Dec. 15, 2020

(54) FUEL SYSTEM FOR AN INTERNAL COMBUSTION ENGINE

(71) Applicant: Volvo Truck Corporation, Gothenburg (SE)

(72) Inventors: Marcus Leidefeldt, Gothenburg (SE); Bengt Henström, Alingsås (SE); Peter Gollungberg, Kyrkesund (SE)

(73) Assignee: Volvo Truck Corporation, Göteborg (SE)

( * ) Notice: Subject to any disclaimer, the term of this patent is extended or adjusted under 35 U.S.C. 154(b) by 0 days.

(21) Appl. No.: 16/493,825

(22) PCT Filed: Mar. 16, 2017

(86) PCT No.: PCT/EP2017/056268
§ 371 (c)(1),
(2) Date: Sep. 13, 2019

(87) PCT Pub. No.: WO2018/166603
PCT Pub. Date: Sep. 20, 2018

(65) Prior Publication Data
US 2020/0080519 A1    Mar. 12, 2020

(51) Int. Cl.
*F02M 21/02*    (2006.01)
*B01F 3/04*    (2006.01)
(Continued)

(52) U.S. Cl.
CPC ..... *F02M 21/0215* (2013.01); *B01F 3/04049* (2013.01); *B60K 15/03006* (2013.01);
(Continued)

(58) Field of Classification Search
CPC ........... F02M 21/0215; F02M 21/0245; F02M 21/06; F02M 21/0275; B60K 15/03006; F17C 7/04; B01F 2215/0086
See application file for complete search history.

(56) References Cited

U.S. PATENT DOCUMENTS

| | | | |
|---|---|---|---|
| 5,408,957 A | | 4/1995 | Crowley |
| 5,421,161 A | * | 6/1995 | Gustafson ................. F17C 9/02 62/7 |

(Continued)

FOREIGN PATENT DOCUMENTS

| | | |
|---|---|---|
| DE | 102007042158 A1 | 3/2009 |
| DE | 202009017653 U1 | 5/2011 |

(Continued)

OTHER PUBLICATIONS

International Search Report and Written Opinion of the International Searching Authority, PCT/EP2017/056268, dated Dec. 5, 2017, 11 pages.

(Continued)

*Primary Examiner* — George C Jin
(74) *Attorney, Agent, or Firm* — Sage Patent Group (57) ABSTRACT

A fuel system for an internal combustion engine includes a liquefied gas tank that stores liquefied gas and a pressurized gas production unit connected to the liquefied gas tank to produce pressurized gas from the liquefied gas. A fuel rail is connected to the pressurized gas production unit. The fuel rail receives the pressurized gas and delivers the pressurized gas to a fuel injector that injects the pressurized gas into a cylinder of the engine. The pressurized gas production unit receives the liquefied gas via a mixing unit that is provided between the liquefied gas tank and the pressurized gas production unit. The mixing unit receives excess gas in the form of vaporized gas from the liquefied gas tank and/or pressurized gas from the fuel rail and mixes the excess gas with the liquefied gas received from the liquefied gas tank.

17 Claims, 5 Drawing Sheets

(51) Int. Cl.
  *B60K 15/03* (2006.01)
  *F02M 21/06* (2006.01)
  *F17C 7/04* (2006.01)

(52) U.S. Cl.
  CPC .... *F02M 21/0245* (2013.01); *F02M 21/0275* (2013.01); *F02M 21/06* (2013.01); *F17C 7/04* (2013.01); *B01F 2003/04092* (2013.01); *B01F 2215/0086* (2013.01); *B60K 2015/03013* (2013.01); *F17C 2221/033* (2013.01); *F17C 2227/0135* (2013.01); *F17C 2227/0393* (2013.01); *F17C 2270/0168* (2013.01)

(56) References Cited

U.S. PATENT DOCUMENTS

| | | | |
|---|---|---|---|
| 2012/0097127 A1 | 4/2012 | Firey | |
| 2014/0230458 A1* | 8/2014 | Choi | F17C 9/02 62/50.2 |
| 2014/0290279 A1* | 10/2014 | Lee | F17C 13/082 62/48.2 |
| 2018/0148138 A1* | 5/2018 | Shin | F25J 1/0294 |
| 2019/0353397 A1* | 11/2019 | Franklin | F28D 7/06 |
| 2020/0032744 A1* | 1/2020 | Song | F02B 39/005 |

FOREIGN PATENT DOCUMENTS

| | | |
|---|---|---|
| DE | 102012002425 A1 | 8/2013 |
| EP | 1785618 A1 | 5/2007 |
| EP | 1990272 A1 | 11/2008 |
| EP | 2796700 A2 | 10/2014 |
| JP | 2005337019 A | 12/2005 |
| JP | 2014227917 A | 12/2014 |
| WO | WO 99/61769 A1 | 12/1999 |
| WO | WO 2016172803 A1 | 11/2016 |

OTHER PUBLICATIONS

International Preliminary Report on Patentability of the International Searching Authority, PCT/EP2017/056268, dated Jul. 10, 2019, 11 pages.

* cited by examiner

FUEL SYSTEM FOR AN INTERNAL COMBUSTION ENGINE

CROSS REFERENCE TO RELATED APPLICATIONS

This application is a 35 U.S.C. § 371 national stage application of PCT International Application No. PCT/EP2017/056268 filed on Mar. 16, 2017, the disclosure and content of which is incorporated by reference herein in its entirety.

TECHNICAL FIELD

The invention relates to a fuel system for an internal combustion engine, the fuel system comprising a liquefied gas tank arranged to store liquefied gas (LNG). The invention also relates to a method of controlling a fuel system for an internal combustion engine in a vehicle. The invention also relates to a computer program, a computer readable medium, a control unit and a vehicle.

The invention can be applied in heavy-duty vehicles, such as trucks, buses and construction equipment, e.g. working machines. The invention can also be applied to cars. Although the invention will be described with respect to a truck, the invention is not restricted to this particular vehicle type.

BACKGROUND

High Pressure Gas Injection (HPGI) internal combustion engines have been the subject of increasing interest and use for some time. The HPGI technology is also known as the High Pressure Direct Injection (HPDI) technology. It allows natural gas engines to operate at the same efficiency and power as modern heavy-duty diesel engines, but with a better fuel efficiency and reduced greenhouse gas emissions depending on the composition of the gaseous fuel used. The HPGI heavy duty gas engine technology is based on direct in-cylinder injection of gaseous fuel providing conditions for mixing limited combustion, or mixing controlled combustion, similar to the process in conventional diesel engines. The fuel is stored in a liquefied gas tank, where it is kept at a low temperature to keep the fuel in liquid form. A high pressure pump and vaporizer transforms the fuel to gaseous form. The gas is supplied to the cylinders using high pressure gas injectors. Additional pilot quantities of diesel fuel are injected in order to accomplish ignition.

In HPGI engines there are usually requirements to dispense of high pressure gas, e.g. during a rapid pressure decrease in the injection system due to a decrease in the engine load, or during an engine stoppage. A need to vent boil-off gas from the liquefied gaseous fuel storage is another common reason for disposing of gas. Such disposal will create an environmental disturbance, since it involves emitting unburned hydrocarbons into the atmosphere. In case of methane gas such emissions also cause unwanted contributions to global warming. Some fuel filling stations are equipped for received vaporized gas when refuelling. In any case, fuel disposal, whether it is of high pressure gas from the injection system or of vent off gas from the fuel storage, creates a loss to the operator of a vehicle in which the engine is provided.

It is known, e.g. from EP1785618A1, to return superfluous gaseous fuel to the fuel storage tank. Where the returned fuel is in gaseous form, e.g. compressed natural gas (CNG), a problem with returning the fuel to a liquefied gas tank is that the returned relatively warm fuel will increase the temperature and pressure in the tank, which reduces a hold time which in turn advances a need to vent vaporized fuel from the tank.

SUMMARY

An object of the invention is to reduce emissions from fuel systems of internal combustion engines with high pressure gas injection. Another object of the invention is to reduce losses from fuel systems of internal combustion engines with high pressure gas injection.

This object is reached with a fuel system for an internal combustion engine, the fuel system comprising a liquefied gas tank arranged to store liquefied gas (LNG), and a pressurized gas production unit connected to the liquefied gas tank, the pressurized gas production unit being arranged to receive liquefied gas from the liquefied gas tank and to produce pressurized gas from the liquefied gas, the fuel system further comprising a fuel rail connected to the pressurized gas production unit and arranged to receive the pressurized gas and to deliver the pressurized gas to a fuel injector adapted to inject the pressurized gas into a cylinder of the engine, wherein a mixing unit is provided between the liquefied gas tank and the pressurized gas production unit whereby the pressurized gas production unit is arranged to receive the liquefied gas via the mixing unit, the mixing unit being arranged to receive excess gas in the form of vaporized gas from the liquefied gas tank and/or pressurized gas from the fuel rail, the mixing unit being arranged to mix the excess gas with the liquefied gas received from the liquefied gas tank, wherein the mixing unit presents a mixing chamber arranged to receive the excess gas and the liquefied gas.

The invention provides for mixing the excess gas with the liquefied gas between the liquefied gas tank and the pressurized gas production unit. This mixing may involve mixing a liquid, i.e. the liquefied gas, with a gas, i.e. the excess gas. The mixing chamber of the mixing unit provides for the mixing of the excess gas with the liquefied gas to be secured. The invention provides for the pressurized gas production unit to process the excess gas as well as the liquefied gas. As a result, the excess gas does not need to be returned to the liquefied gas tank and the risk of increased vaporization in the tank may be avoided. Thereby losses of fuel may be reduced or avoided. Also, venting gaseous to the atmosphere may be reduced or avoided. Thus, the invention may substantially reduce environmental disturbances caused by excess gaseous fuel in high pressure gas injection engines. Further, the invention may substantially increase the amount of useful work provided by the fuel due to the excess gas being combusted in the engine.

The mixing chamber may form an internal cavity of the mixing unit. The mixing chamber may present an at least partly rounded shape. Thereby, the presence of sharp corners in the internal cavity of the mixing chamber is reduced or eliminated, and this may promote an even distribution of the liquefied gas, which in turn is beneficial for thoroughly mixing the liquefied gas with the excess gas.

Preferably, the mixing chamber presents a spherical shape. Thereby, the presence of sharp corners in the internal cavity of the mixing chamber is eliminated, and a thorough mix of the liquefied gas with the excess gas may be further secured. It should be noted however, that the mixing chamber may present a variety of alternative geometries, e.g. cylindrical, ellipsoidal, dome shaped, cubical or pyramid shaped.

Preferably, the mixing unit is arranged to receive the liquefied gas from the liquefied gas tank via a liquefied gas connection, and a nozzle is arranged to be fed by the liquefied gas connection and to spray the liquefied gas into the mixing chamber. The nozzle may be fed by the pressure in the liquefied gas tank, and/or by a delivery pump arranged to pump the liquefied gas through the liquefied gas connection towards the mixing unit. The nozzle may dispense the liquefied gas into the mixing chamber in the form of droplets. Such droplets may be small enough to promote a thorough mix of the liquefied gas with the excess gas.

Preferably, the nozzle is arranged to introduce the spray of liquefied gas in an upper portion of the mixing chamber. Thereby, gravity may assist to distribute the liquefied gas in the mixing chamber. Thereby, at least a major portion of the mixing chamber may be filled with droplets of the liquefied gas. Thus, a thorough mix of the liquefied gas with the excess gas is further promoted. The nozzle is preferably centered in a horizontal cross-section of the mixing chamber.

Preferably, the mixing unit is arranged to receive excess gas at an inlet to the mixing chamber, which inlet is located below the nozzle. Thereby, the excess gas may advantageously be introduced into an area where the concentration of liquefied gas droplets is higher than elsewhere in the mixing chamber. This provides an additional promotion of a thorough mix of the liquefied gas with the excess gas.

Preferably, the mixing unit is arranged to guide a mix of the liquefied gas and the excess gas away from the mixing chamber via an outlet at a bottom region of the mixing chamber. Thereby, the outlet is beneficially located where the mix of the liquefied gas and the excess gas is moved by the assistance of gravity. Where the nozzle is arranged to introduce the spray of liquefied gas in an upper portion of the mixing chamber, and the mixing unit is arranged to receive excess gas at an inlet to the mixing chamber, which inlet is located below the nozzle, such a location of the outlet may provide for the liquefied gas and the excess gas to mix thoroughly before being guided away from the mixing chamber.

Preferably, the fuel system further comprises an admission valve arranged to control the flow of excess gas to the mixing unit. Thereby a control of the ratio of the excess gas flow to the liquefied gas flow may be provided by suitable control of the admission valve.

Preferably, the fuel system further comprises a delivery control valve arranged to control the flow of liquefied gas to the mixing unit. Thereby a further control of the ratio of the excess gas flow to the liquefied gas flow may be provided by suitable control of the delivery control valve.

Preferably, the fuel system further comprises a connection between the liquefied gas tank and the mixing unit for the mixing unit to receive the excess gas in the form of the vaporized gas from the liquefied gas tank. Thereby vapor gas from the liquefied gas tank may be transported to be combusted in the engine, thereby avoiding the need to vent it.

Preferably, the fuel system further comprises a connection between the fuel rail and the mixing unit for the mixing unit to receive the excess gas in the form of the pressurized gas from the fuel rail. Thereby superfluous pressurized gas from the fuel rail may be transported back to the mixing unit and once again to the fuel rail to be combusted in the engine, thereby avoiding the need to vent it.

Preferably, the fuel system comprises an excess gas buffer tank arranged to receive the excess gas from the liquefied gas tank and/or from the fuel rail before the excess gas is delivered to the mixing unit. Thereby, the excess gas may be temporarily stored before introduced to the mixing unit. This provides for controlling the relationship between the flow of excess gas to the mixing unit and the flow of liquefied gas to the mixing unit at least partly based on a determined nature of the operational condition of the vehicle, as exemplified below.

Preferably, the fuel system comprises an excess gas boosting pump arranged to pressurize the excess gas and to deliver the pressurized excess gas to the mixing unit. Thereby it may be secured that the excess gas is not delivered to the mixing unit at a pressure that is lower than the pressure of the liquefied gas delivered to the mixing unit, by operation of the excess gas boosting pump when needed. The excess gas from the fuel rail may be delivered from the fuel rail at a high pressure. However, the operation of the excess gas boosting pump may be needed where the excess gas is delivered exclusively as vent off gas from the liquefied gas tank.

Preferably, the pressurized gas production unit is arranged to produce the pressurized gas to be at a pressure of at least 400 bar, or at least 500 bar. Preferably, the pressurized gas production unit comprises a pressurizing pump arranged to be driven by a hydraulic motor. Preferably, the hydraulic motor is arranged to be driven by hydraulic fluid pressurized by a hydraulic pump adapted to be driven by a crankshaft of the engine. Thereby it may be secured that the engine receives the pressurized gas at a suitable pressure level depending on requirements on the fuel system, e.g. by control of the hydraulic pressure to the hydraulic motor. As a comparison, if the pressurizing pump is arranged to be driven directly by the crankshaft of the engine, the work of the pressurizing pump will be dependent on the engine rotational speed. However, a benefit of the pressurizing pump being arranged to be driven directly by the crankshaft, e.g. via a gear wheel connection or a belt, is that operating losses may be kept low.

Preferably, the pressurized gas production unit comprises a pressurizing pump arranged to pressurize the received liquefied gas, and a heat exchanger provided between the pressurizing pump and the fuel rail. Thereby an efficient engine operation may be secured since the heat exchanger may provide a control of the temperature of the fuel delivered to the fuel rail, to thereby control the density of the gaseous fuel. A known density of the gaseous fuel will make it easier to control the energy provided with the fuel by controlling the volume of delivered fuel.

The objects are also reached with a method of controlling a fuel system for an internal combustion engine in a vehicle, the fuel system comprising a liquefied gas tank arranged to store liquefied gas (LNG), and a pressurized gas production unit connected to the liquefied gas tank, the pressurized gas production unit being arranged to receive liquefied gas from the liquefied gas tank and to produce pressurized gas from the liquefied gas, the fuel system further comprising a fuel rail connected to the pressurized gas production unit and arranged to receive the pressurized gas and to deliver the pressurized gas to a fuel injector adapted to inject the pressurized gas into a cylinder of the engine, the method comprising allowing the pressurized gas production unit to receive the liquefied gas via a mixing unit provided between the liquefied gas tank and the pressurized gas production unit, allowing excess gas in the form of vaporized gas from the liquefied gas tank and/or pressurized gas from the fuel rail to be delivered to the mixing unit, allowing the excess gas to mix in the mixing unit with the liquefied gas received from the liquefied gas tank, determining the nature of at least one operational condition of the vehicle, and controlling the relationship between the flow of excess gas to the mixing unit and the flow of liquefied gas to the mixing unit at least partly based on the determined nature of the operational condition of the vehicle.

The advantages of allowing excess gas in the form of vaporized gas from the liquefied gas tank and/or pressurized gas from the fuel rail to be delivered to the mixing unit, and allowing the excess gas to mix in the mixing unit with the liquefied gas received from the liquefied gas tank, are understood from the discussion above. In addition, controlling the relationship between the flow of excess gas to the mixing unit and the flow of liquefied gas to the mixing unit at least partly based on the determined nature of the operational condition of the vehicle provides an advantageous manner of adjusting the provision of excess gas in view of the operational condition. Mixing excess gas in the liquefied gas, at least at a large ratio, may be disadvantageous to the operation of a pressurizing pump of the pressurized gas production unit, which may operate more efficiently when pumping a fluid in liquid form than when pumping a fluid in gaseous form. In some operational conditions more than others, a slightly reduced efficiency of the pressurizing pump may be acceptable, and the method provides for controlling the excess gas provision in view thereof.

In some embodiments, one of the at least one operational condition is a load on the engine. Controlling the relationship between the flow of excess gas to the mixing unit and the flow of liquefied gas to the mixing unit at least partly based on the load on the engine provides a particularly advantageous manner of adjusting the provision of excess gas in view of the operational condition. Mixing excess gas in the liquefied gas, at least at a relatively large ratio, with a resulting reduced pressurizing pump efficiency, may be disadvantageous to the operation of the engine where the load on the engine is relatively high. However, in situations where the load on the engine is relatively low, e.g. at idling, or even negative, e.g. at engine braking, a slightly reduced pressurizing pump due to mixing excess gas in the liquefied gas may be acceptable. Thereby, advantage may be taken of the forgiving nature of the low engine load pump operation to remove excess gas from the fuel system.

In some embodiments, one of the at least one operational condition is an inclination of a road on which the vehicle is travelling. When the vehicle enters a downhill road inclination, and an engine brake mode, the relationship between the flow of excess gas to the mixing unit and the flow of liquefied gas to the mixing unit may be controlled so as to be relatively high. Thereby, pressurized gas produced by the pressurized gas production unit may be stored in a high pressure buffer tank between the pressurized gas production unit and the fuel rail.

One of the at least one operational condition may be a predicted operational condition. For example, the operational condition may be a predicted inclination of a road on which the vehicle is travelling. Such a prediction may be made e.g. by means of map data of a device of the Global Positioning System (GPS). Thereby, where a prediction of a downhill road inclination is made, the fuel system may be controlled so that the pressure in a high pressure buffer tank between the pressurized gas production unit and the fuel rail is relatively low. When the vehicle reaches the downhill inclination, and enters an engine brake mode, the relationship between the flow of excess gas to the mixing unit and the flow of liquefied gas to the mixing unit may be controlled so as to be relatively high, whereby the pressure in the high pressure buffer tank is increased.

Preferably the method comprises controlling the pressure of the excess gas delivered to the mixing unit to not be lower than the pressure of the liquefied gas delivered to the mixing unit. Such control may involve controlling an excess gas boosting pump arranged to pressurize the excess gas and to deliver the pressurized excess gas to the mixing unit, as described above. As stated, thereby it may be secured that the excess gas is not delivered to the mixing unit at a pressure that is lower than the pressure of the liquefied gas delivered to the mixing unit. Thereby it may be secured that the excess gas can be mixed with the liquefied gas in the mixing unit.

The excess gas boosting pump may secure an excess gas pressure e.g. of 50 bar, which may be a pressure at which the liquefied gas is stored and supplied to the mixing unit, and which will keep the liquefied gas sensitivity to temperature increases relatively low. Such a reduced sensitivity may be useful, since the liquefied gas temperature may increase when the liquefied gas is transported from the liquefied gas tank to the to pressurized gas production unit. Keeping the liquefied gas in liquid form is desired since a pressurizing pump of the pressurized gas production unit will work significantly more efficiently with fluids in liquid form than with fluids in gas form.

The objects are also reached with a method of controlling a fuel system for an internal combustion engine in a vehicle, the fuel system comprising a liquefied gas tank arranged to store liquefied gas (LNG), and a pressurized gas production unit connected to the liquefied gas tank, the pressurized gas production unit being arranged to receive liquefied gas from the liquefied gas tank and to produce pressurized gas from the liquefied gas, the fuel system further comprising a fuel rail connected to the pressurized gas production unit and arranged to receive the pressurized gas and to deliver the pressurized gas to a fuel injector adapted to inject the pressurized gas into a cylinder of the engine, characterized by allowing the pressurized gas production unit to receive the liquefied gas via a mixing unit provided between the liquefied gas tank and the pressurized gas production unit, allowing excess gas in the form of vaporized gas from the liquefied gas tank and/or pressurized gas from the fuel rail to be delivered to the mixing unit, allowing the excess gas to mix in the mixing unit with the liquefied gas received from the liquefied gas tank, and controlling the pressure of the excess gas delivered to the mixing unit to not be lower than the pressure of the liquefied gas delivered to the mixing unit.

Advantages of allowing excess gas in the form of vaporized gas from the liquefied gas tank and/or pressurized gas from the fuel rail to be delivered to the mixing unit, allowing the excess gas to mix in the mixing unit with the liquefied gas received from the liquefied gas tank, and controlling the relationship between the flow of excess gas to the mixing unit and the flow of liquefied gas to the mixing unit at least partly based on the determined nature of the operational condition of the vehicle, are understood from the discussion above.

Preferably, the flow of excess gas to the mixing unit is smaller than the flow of liquefied gas to the mixing unit. Thereby, it may be secured that a pressurizing pump of the pressurized gas production unit is working with a major part of its efficiency retained even if a portion of the media pumped is in gas form. For example, the liquefied gas flow could be at least 80%, preferably at least 90%, of the total fluid flow to the mixing unit.

The objects are also reached with a computer program according to claim 26, a computer readable medium according to claim 27, a control unit according to claim 28, or a vehicle according to claim 29.

Further advantages and advantageous features of the invention are disclosed in the following description.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
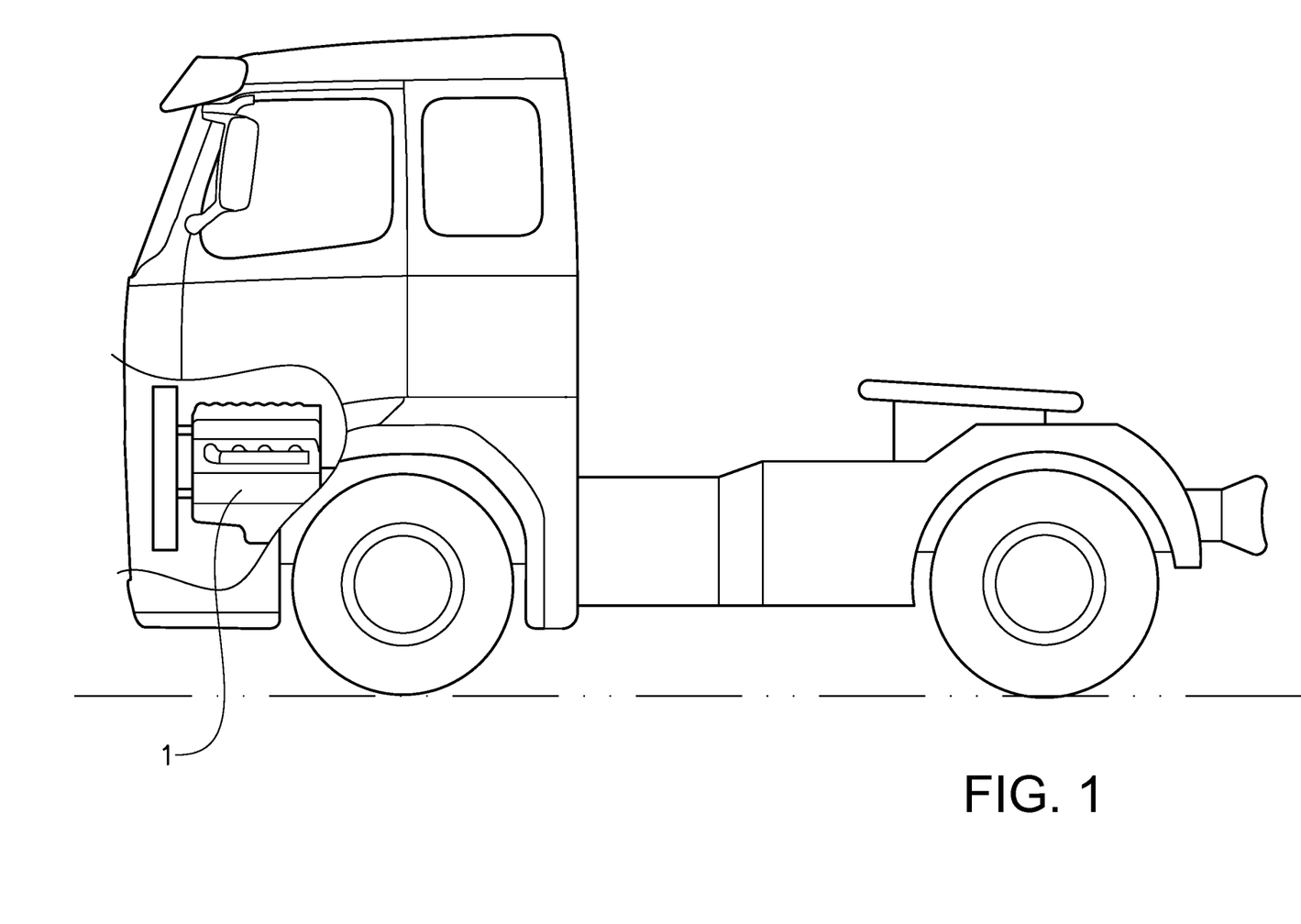
FIG. 1 is a partially sectioned side view of a vehicle in the form of a truck.

FIG. 1 shows a vehicle in the form of a truck, or a tractor for a semitrailer. It should be noted that the vehicle can be of a variety of alternative types, e.g. it may be a car, a bus, or a working machine such as a wheel loader. The vehicle comprises an engine system with a high pressure gas injection (HPGI) internal combustion engine 1. The engine is adapted to a diesel cycle.

Figure 2:
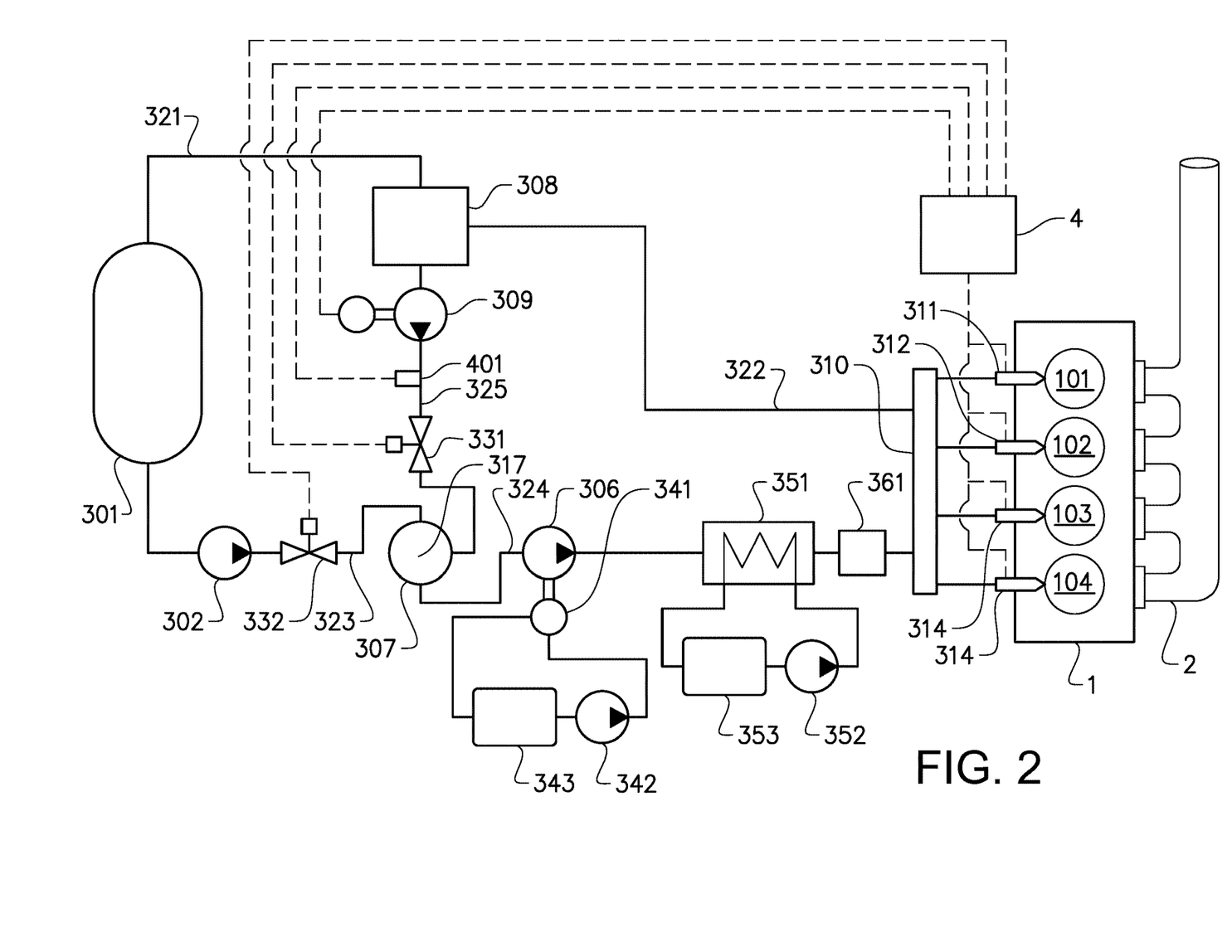
FIG. 2 is a diagram of an engine system in the vehicle in FIG. 1.

FIG. 2 depicts components of the engine system including the engine 1 which in this example has four cylinders 101-104. It is understood that the engine may have any number of cylinders, in any suitable configuration, such as a V-configuration or an in-line configuration, as in this example. The engine system comprises an air intake manifold 2 for the engine 1.

The engine system further comprises a fuel system for an internal combustion engine 1. The fuel system comprises an electronic control unit 4 configured to control parts of the fuel system as exemplified below, and to thereby perform the steps of a method described below. The control unit 4 may comprise an electronic data processor and an electronic data storage. It is understood that the control unit 4 may be provided as one single physical unit, or a plurality of physical units arranged to communicate with each other. Also the control unit 4 may form a part of a control system for controlling in addition to the fuel system other functions and sub-systems in the engine system.

The fuel system comprises a liquefied gas tank 301 arranged to store liquefied gas (LNG). The liquefied gas may be any suitable type of gaseous fuel; in this example the liquefied gas is natural gas comprising methane. Other possible gases include propane and butane.

A pressurized gas production unit 306, 351 is arranged to produce pressurized gas from the liquefied gas. The pressurized gas production unit 306, 351 comprises a pressurizing pump 306 is connected to the liquefied gas tank 301. The pressurizing pump 306 is arranged to receive liquefied gas from the liquefied gas tank 301 and to pressurize the received liquefied gas. In this example, the pressurizing pump 306 is arranged to pressurize the liquefied gas to be at a pressure of at least 400 bar.

The pressurizing pump 306 is arranged to be driven by a hydraulic motor 341. The hydraulic motor 341 is arranged to be driven by hydraulic fluid pressurized by a hydraulic pump 342 adapted to be driven by a crankshaft of the engine. It is understood that the pressurizing pump 306 may be driven in any suitable alternative manner, e.g. by an electric motor.

The fuel system further comprises a fuel rail 310 connected to the pressurizing pump 306, and a fuel injector 311-314 at each cylinder 101-104.

The pressurized gas production unit 306, 351 further comprises a heat exchanger 351 is provided between the pressurizing pump 306 and the fuel rail 310. Some of the liquefied gas may be transformed to a gaseous form in the pressurizing pump 306. The heat exchanger 351 works as a vaporizer to transform any remaining liquefied gas to a gaseous form.

The heat exchanger 351 forms a part of a heat exchange circuit with a heat exchange pump 352 and a reservoir 353 for a heat exchange liquid, e.g. water. The heat exchange pump 352 is arranged to pump the heat exchange liquid from the reservoir 353 and through the heat exchanger 351. A heater (not shown) may be provided to heat the heat exchange liquid. Thereby, the heat exchanger 351 is arranged to increase the temperature of the fluid from the pressurizing pump 306 in order to convert any remaining liquefied gas therein to a gaseous form.

The fuel rail 310 is arranged to receive the pressurized gas from the heat exchanger 351 and to deliver the pressurized gas to the fuel injectors 311-314. The fuel injectors 311-314 are adapted to inject the pressurized gas into the cylinders 101-104. It should be noted that the fuel injectors 311-314 may be arranged to change the fuel injection pressure, e.g. based on the engine load. Thus, the pressure may vary depending on the operational situation of the engine.

A high pressure buffer tank 361 is provided between the heat exchanger 351 and the fuel rail 310.

The engine system may in some embodiments comprise a pilot fuel system (not shown) for injecting a pilot fuel into the cylinders 101-104. Any suitable type of pilot fuel may be used; e.g. diesel fuel or dimethyl ester (DME). The pilot fuel system may comprise a pilot fuel tank, a pilot fuel injector at each cylinder, and a pilot fuel pump between the pilot fuel tank and the pilot fuel injectors. In each cylinder 101-104 the respective fuel injector 311-314 and pilot fuel injector may be provided as separate units, or combined in a single combination injector, as is known per se.

A mixing unit 307 is provided between the liquefied gas tank 301 and the pressurizing pump 306. Thus, the pressurizing pump 306 is arranged to receive the liquefied gas via the mixing unit 307. Thereby, the mixing unit 307 is connected to the liquefied gas tank 301 via a liquefied gas connection 323, and to the pressurizing pump 306 via a pump connection 324.

An excess gas buffer tank 308 is arranged to receive excess gas in the form of vaporized gas from the liquefied gas tank 301. For this the fuel system comprises a vapor gas connection 321 between the liquefied gas tank 301 and the excess gas buffer tank 308 for the excess gas buffer tank 308 to receive excess gas in the form of the vaporized gas from the liquefied gas tank 301. The transport of vaporized gas from the liquefied gas tank 301 to the excess gas buffer tank 308 may be controlled by means of a pressure sensor (not shown), e.g. in the liquefied gas tank 301, and a valve (not shown) in the vapor gas connection 321.

The excess gas buffer tank 308 is further arranged to receive excess gas in the form of pressurized gas from the fuel rail 310. For this the fuel system comprises a pressurized gas connection 322 between the fuel rail 310 and the excess gas buffer tank 308 for the excess gas buffer tank 308 to receive the excess gas in the form of the pressurized gas from the fuel rail 310. The transport of pressurized gas from the fuel rail 310 to the excess gas buffer tank 308 may be controlled by means of a pressure sensor (not shown), e.g. in the fuel rail 310, and a valve (not shown) in the pressurized gas connection 322.

The mixing unit 307 is arranged to receive excess gas from the excess gas buffer tank 308 via an excess gas connection 325. Combinations of the vapor gas connection 321 and the excess gas connection 325, and of the pressurized gas connection 322 and the excess gas connection 325, are herein also simply referred to as connections.

The fuel system further comprises an admission valve 331 arranged to control the flow of excess gas to the mixing unit 307. The admission valve 331 is controllable by the control unit 4. The admission valve 331 may be controlled so as to allow a plurality of flow levels, or a flow adjustment without any discontinuity, between a fully open and a fully closed position.

The fuel system comprises an excess gas boosting pump 309 arranged to pressurize the excess gas and to deliver the pressurized excess gas to the mixing unit 307. The excess gas boosting pump 309 is controllable by the control unit 4.

The fuel system further comprises a delivery control valve 332 arranged to control the flow of liquefied gas to the mixing unit 307. The delivery control valve 332 is arranged to control the flow through the liquefied gas connection 323. The delivery control valve 332 is controllable by the control unit 4. The delivery control valve 332 may be controlled so as to allow a plurality of flow levels, or a flow adjustment without any discontinuity, between a fully open and a fully closed position.

The fuel system further comprises a delivery pump 302 arranged to pump the liquefied gas through the liquefied gas connection 323, towards the mixing unit 307. In this embodiment the delivery pump 302 is provided between the liquefied gas tank 301 and the delivery control valve 332. In alternative embodiments the delivery pump 302 may be provided between the delivery control valve 332 and the mixing unit 307.

Figure 3:
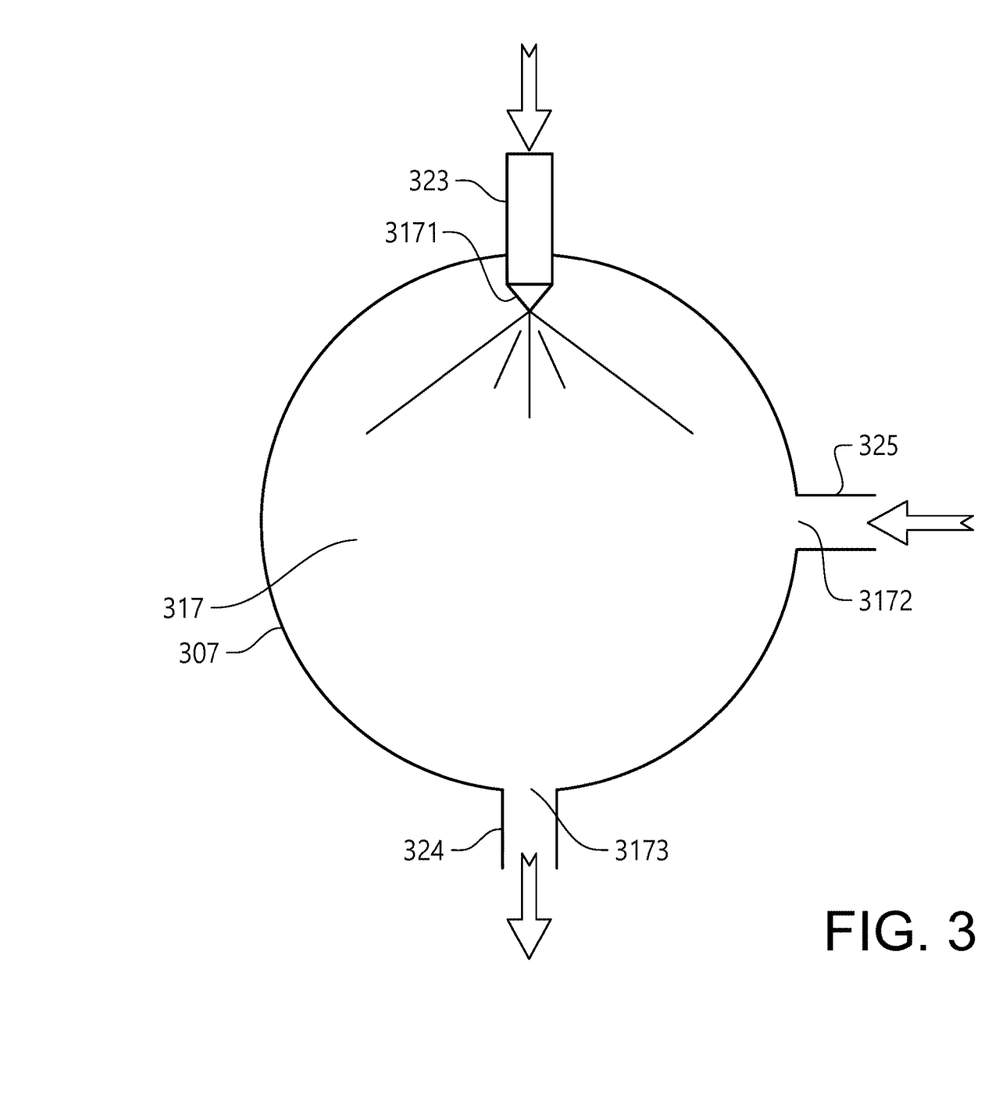
FIG. 3 shows a detail in the engine system in FIG. 2.

Reference is made also to FIG. 3. The mixing unit 307 is arranged to mix the excess gas with the liquefied gas received from the liquefied gas tank 301. For this the mixing unit 307 presents a mixing chamber 317 arranged to receive the excess gas and the liquefied gas. As understood from FIG. 3, the mixing chamber 317 forms an internal cavity of the mixing unit 307. The mixing chamber 317 presents a rounded, more specifically a spherical shape. A nozzle 3171 is arranged to be fed by the liquefied gas connection 323. The nozzle 3171 is arranged to spray centrally in an upper portion of the mixing chamber 317 the liquefied gas. Thereby, at least a major portion of the mixing chamber 317 may be filled with small droplets of the liquefied gas. The excess gas is guided with the excess gas connection 325 to an inlet 3172 which is located vertically in the center of the mixing chamber 317. Thereby the excess gas may be mixed with the spray of liquefied gas. The mix of excess gas and liquefied gas is guided away from the mixing chamber via an outlet 3173 to the pump connection 324, at a bottom region of the mixing chamber 317.

It should be noted that in alternative embodiments, the mixing chamber 317 may have another geometry; e.g. it may be cylindrical, ellipsoidal, dome shaped, cubical or pyramid shaped.

The control unit 4 is arranged to determine the engine load, e.g. in the form an output torque of the engine. This may be done in a manner known per se, e.g. based on the engine rotational speed and the amount of fuel injected by the fuel injectors 311-314.

Figure 4:
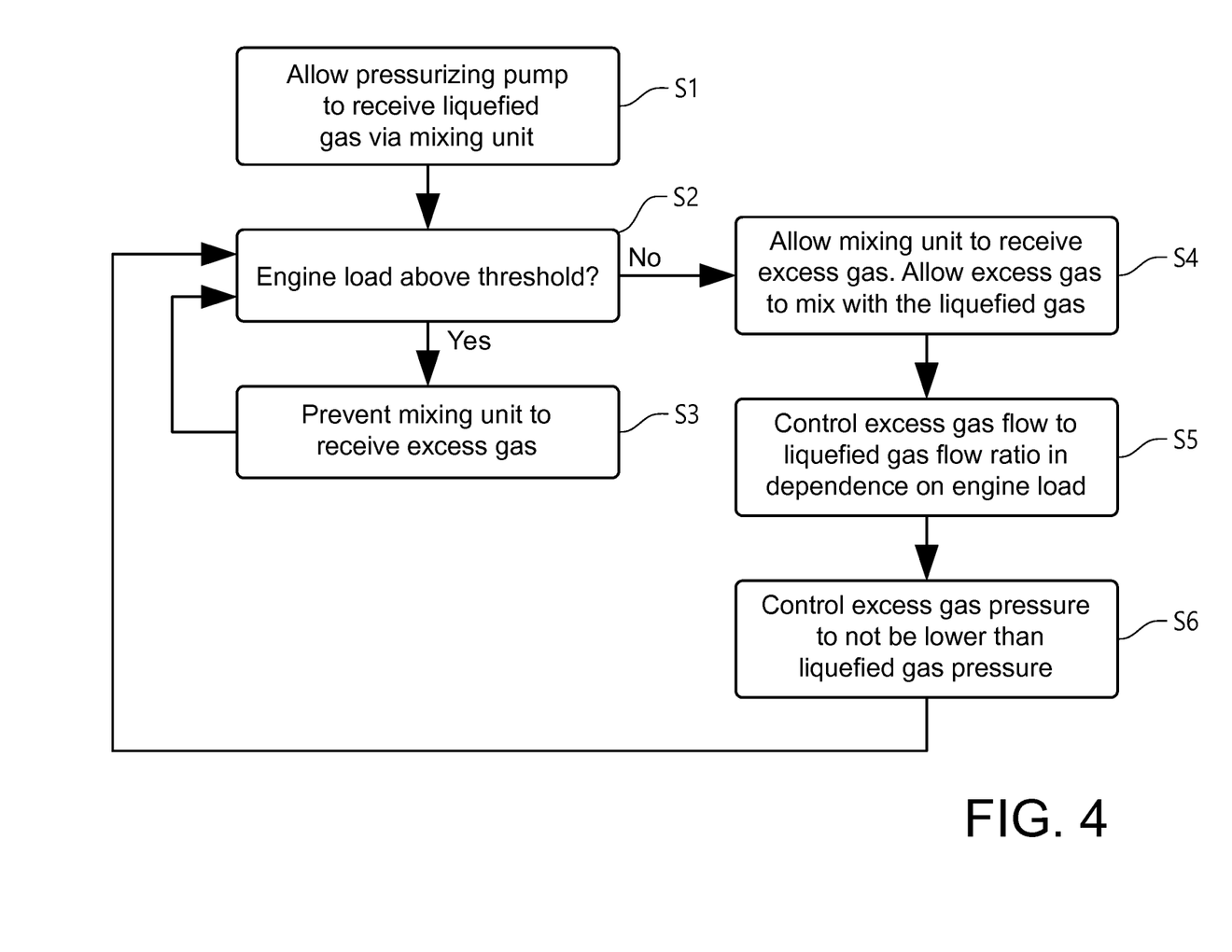
FIG. 4 is a flow diagram depicting steps in a method in the engine system in FIG. 2.

With reference to FIG. 4, a method of controlling the fuel system will be described. During operation of the engine 1, the pressurizing pump 306 is allowed S1, by control of the delivery control valve 332, to receive liquefied gas via the mixing unit 307. The control unit 4 determines continuously or repeatedly the engine load. Thereby, the control unit 4 determines S2 whether the engine load is above a threshold value. If the engine load is above the threshold value, the mixing unit 307 is not allowed S3, by control of the admission valve 331 and the excess gas boosting pump 309, to receive excess gas.

If the engine load is below the threshold value, the mixing unit 307 is allowed S4, by control of the admission valve 331 and the excess gas boosting pump 309, to receive excess gas. Thereby, the excess gas is allowed S5 to mix in the mixing unit 307 with the liquefied gas received from the liquefied gas tank 301. Thereby, the relationship between the flow of excess gas to the mixing unit 307 and the flow of liquefied gas to the mixing unit 307 is determined based on the engine load. I.e. it is determined based on the engine load whether any excess gas flow is allowed to the mixing unit.

In addition, where the excess gas is allowed to the mixing unit, the relationship between the flow of excess gas to the mixing unit 307 and the flow of liquefied gas to the mixing unit 307 is determined based on the engine load. The excess gas flow is controlled S5 with the admission valve 331. At very low engine loads or at negative loads, e.g. at idling or at engine braking, the admission valve 331 is controlled so as to provide a relatively large ratio of excess gas flow to liquefied gas flow. As the load increases towards the threshold value, the admission valve 331 is controlled so as to reduce the ratio of excess gas flow to liquefied gas flow. In any case, the flow of excess gas to the mixing unit 307 is considerably smaller than the flow of liquefied gas to the mixing unit 307. For example, the excess gas flow may be no more than 15% or no more than 10% or the liquefied gas flow.

In alternative embodiments, instead of, or in addition to, the engine load, the ratio of excess gas flow to liquefied gas flow may be determined based on some other operational condition of the vehicle, for example an inclination of a road on which the vehicle is travelling. The road inclination may be determined e.g. by means of an inclination sensor in a transmission (not shown) of the vehicle. Based on such inclination information, it may be determined whether the vehicle is in an engine braking situation, e.g. in a downhill inclination of the road. In an engine braking situation, the admission valve 331 may be controlled so as to allow a relatively large ratio of excess gas flow to liquefied gas flow.

In some embodiments, a predicted inclination of the road on which the vehicle is travelling is determined. Such a prediction may be made e.g. by means of map data of a device of the Global Positioning System (GPS). As suggested above, thereby, where a prediction of a downhill road inclination is made, the fuel system may be controlled so that the pressure in the high pressure buffer tank 361 between the heat exchanger 351 and the fuel rail 310 is relatively low. When the vehicle reaches the downhill inclination, and enters an engine brake mode, the relationship between the flow of excess gas to the mixing unit 307 and the flow of liquefied gas to the mixing unit 307 may be controlled so as to be relatively high, whereby the pressure in the high pressure buffer tank 361 is increased.

Regardless of the ratio of excess gas flow to liquefied gas flow, the pressure of the excess gas delivered to the mixing unit 307 is controlled S6 to not be lower than the pressure of the liquefied gas delivered to the mixing unit 307. The excess gas pressure is determined by means of a pressure sensor 401 upstream of the mixing unit 307. The liquefied gas pressure may be determined by a pressure sensor (not shown) in the liquefied gas tank 301. The excess gas boosting pump 309 is used to avoid that the excess gas pressure is lower than the liquefied gas pressure.

As stated the engine load is continuously or repeatedly determined S2, and where the engine load increases to be above the threshold value, the mixing unit 307 is not allowed S3, by control of the admission valve 331 and the excess gas boosting pump 309, to receive excess gas.

Figure 5:
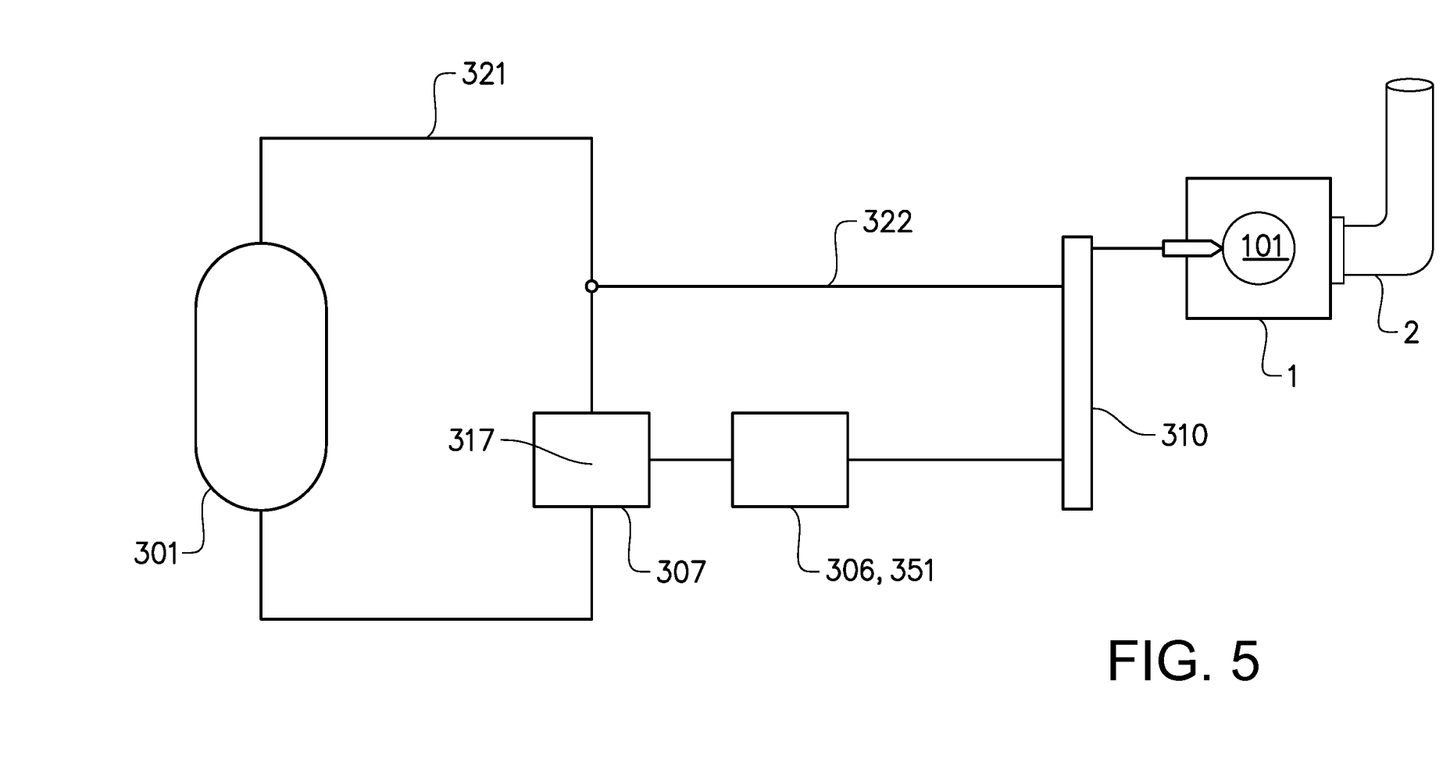
FIG. 5 is a diagram of an engine system according to an alternative embodiment.

FIG. 5 shows an engine system with a fuel system according to an alternative embodiment. The fuel system comprising a liquefied gas tank 301 arranged to store liquefied gas (LNG), and a pressurized gas production unit 306, 351 connected to the liquefied gas tank 301. The pressurized gas production unit 306, 351 is arranged to receive liquefied gas from the liquefied gas tank 301 and to produce pressurized gas from the liquefied gas: The fuel system further comprising a fuel rail 310 connected to the pressurized gas production unit 306, 351 and arranged to receive the pressurized gas and to deliver the pressurized gas to a fuel injector 311 adapted to inject the pressurized gas into a cylinder 101 of an engine 1 of the engine system. A mixing unit 307 is provided between the liquefied gas tank 301 and the pressurized gas production unit 306, 351 whereby the pressurized gas production unit 306, 351 is arranged to receive the liquefied gas via the mixing unit 307. The mixing unit 307 is arranged to receive excess gas in the form of vaporized gas from the liquefied gas tank 301 and/or pressurized gas from the fuel rail 310. The mixing unit 307 is arranged to mix the excess gas with the liquefied gas received from the liquefied gas tank 301. The mixing unit 307 presents a mixing chamber 317 arranged to receive the excess gas and the liquefied gas.

It is to be understood that the present invention is not limited to the embodiments described above and illustrated in the drawings; rather, the skilled person will recognize that many changes and modifications may be made within the scope of the appended claims.

The invention claimed is:

1. A fuel system for an internal combustion engine, the fuel system comprising: a liquefied gas tank arranged to store liquefied gas; and a pressurized gas production unit connected to the liquefied gas tank, the pressurized gas production unit being arranged to receive liquefied gas from the liquefied gas tank and to produce pressurized gas from the liquefied gas;

wherein a mixing unit is provided between the liquefied gas tank and the pressurized gas production unit whereby the pressurized gas production unit is arranged to receive the liquefied gas via the mixing unit, wherein the mixing unit is arranged to receive excess gas in the form of vaporized gas from the liquefied gas tank and/or pressurized gas from a fuel rail of the fuel system, the fuel rail being connected to the pressurized gas production unit and arranged to receive the pressurized gas and to deliver the pressurized gas to a fuel injector adapted to inject the pressurized gas into a cylinder of the engine, the mixing unit being arranged to mix the excess gas with the liquefied gas received from the liquefied gas tank, wherein the mixing unit presents a mixing chamber arranged to receive the excess gas and the liquefied gas, wherein the mixing unit is arranged to receive the liquefied gas from the liquefied gas tank via a liquefied gas connection, and a nozzle is arranged to be fed by the liquefied gas connection and to spray the liquefied gas into the mixing chamber, and wherein the mixing unit is arranged to guide a mix of the liquefied gas and the excess gas away from the mixing chamber to the pressurized gas production unit via an outlet at a bottom region of the mixing chamber.

2. A fuel system according to claim 1, wherein the mixing chamber forms an internal cavity of the mixing unit.

3. A fuel system according to claim 1, wherein the mixing chamber presents an at least partly rounded shape.

4. A fuel system according to claim 1, wherein the mixing chamber presents a spherical shape.

5. A fuel system according to claim 1, wherein the nozzle is arranged to introduce the spray of liquefied gas in an upper portion of the mixing chamber.

6. A fuel system according to claim 1, wherein the mixing unit is arranged to receive excess gas at an inlet to the mixing chamber, which inlet is located below the nozzle.

7. A fuel system according to claim 1, wherein the fuel system further comprises an admission valve arranged to control the flow of excess gas to the mixing unit.

8. A fuel system according to claim 1, wherein the fuel system further comprises a delivery control valve arranged to control the flow of liquefied gas to the mixing unit.

9. A fuel system according to claim 1, wherein the fuel system further comprises a connection between the liquefied gas tank and the mixing unit for the mixing unit to receive the excess gas in the form of the vaporized gas from the liquefied gas tank.

10. A fuel system according to claim 1, wherein the fuel system further comprises a connection between the fuel rail and the mixing unit for the mixing unit to receive the excess gas in the form of the pressurized gas from the fuel rail.

11. A fuel system according to claim 1, wherein the fuel system comprises an excess gas buffer tank arranged to receive the excess gas from the liquefied gas tank and/or from the fuel rail before the excess gas is delivered to the mixing unit.

12. A fuel system according to claim 1, wherein the fuel system comprises an excess gas boosting pump arranged to pressurize the excess gas and to deliver the pressurized excess gas to the mixing unit.

13. A fuel system according to claim 1, wherein the pressurized gas production unit is arranged to produce the pressurized gas to be at a pressure of at least 400 bar.

14. A fuel system according to claim 1, wherein the pressurized gas production unit comprises a pressurizing pump arranged to be driven by a hydraulic motor.

15. A fuel system according to claim 14, wherein the hydraulic motor is arranged to be driven by hydraulic fluid pressurized by a hydraulic pump adapted to be driven by a crankshaft of the engine.

16. A fuel system according to claim 1, wherein the pressurized gas production unit comprises a pressurizing pump arranged to pressurize the received liquefied gas, and a heat exchanger provided between the pressurizing pump and the fuel rail.

17. A vehicle comprising a fuel system according to claim 1.

* * * * *